INVENTORS:
NICHOLAS LANGER
HENRY ROGERS MALLORY
BY
ATTORNEY

Nov. 30, 1965

N. LANGER ETAL 3,221,239

TRANSISTORS AS ANTI-REVERSAL DEVICES FOR SERIES CONNECTED
RECHARGEABLE CELLS

Filed May 13, 1963

INVENTORS:
NICHOLAS LANGER
HENRY ROGERS MALLORY
BY

ATTORNEY

United States Patent Office 3,221,239
Patented Nov. 30, 1965

3,221,239
TRANSISTORS AS ANTI-REVERSAL DEVICES FOR SERIES CONNECTED RECHARGEABLE CELLS
Nicholas Langer, New York, N.Y., and Henry Rogers Mallory, Greenwich, Conn., assignors to P. R. Mallory & Co., Inc., Indianapolis, Ind., a corporation of Delaware
Filed May 13, 1963, Ser. No. 279,810
6 Claims. (Cl. 320—17)

This invention relates to series connected rechargeable cells and, more particularly, to anti-reversal devices preventing the flow of current in the reversed direction through any one of such cells upon the said cell becoming completely discharged.

Most practical applications involving rechargeable sealed cells require series connection of a plurality of cells into a battery in order to provide the necessary operating voltage. Serious difficulties follow from this practice due to the fact that at the present state of the art it is virtually impossible to produce cells of identical capacities. Also, even though initially the individual capacities of the cells constituting the battery may be reasonably similar, during life of the cycled battery, such individual capacities progressively tend to become more diverse, thereby increasing the seriousness of the problem. Eventually, during discharge, the cell of least capacity in the series string will be forced into voltage reversal and effectively reverse charged. This is due to the inferior cell's inability to supply current at the rate set by the remaining cells and the load, the reversed cell then acting as an impedance and developing a voltage drop having a polarity opposite to that normal for the cell. A polarity reversal of the described character and the reverse charging resulting therefrom are highly undesirable. In the first place, it causes a substantial voltage drop and thus wastes a great deal of battery power. A much more serious difficulty is that reverse charging causes heavy gas generation which cannot be tolerated in a sealed cell as it may lead to bulging, leakage or even catastrophic destruction of the cell due to explosion. It has been recognized, therefore, that means to prevent polarity reversal must be provided for each cell of a battery of series connected rechargeable cells.

It has been already proposed to provide polarity reversal protection for batteries by connecting a rectifier or a diode across each and every cell of the series string in such a direction that current passage in the rectifier is from the negative to the positive terminal of the corresponding cell. Thus, while the cells are discharging in the normal direction and manner, the diodes will be non-conducting, apart from the leakage current flowing through the circuit. On the other hand, in the event of polarity reversal in any one of the cells, the diode connected across the same becomes conducting and will by-pass the load current around the said cell. An arrangement of this type is disclosed, for example, in Jacquier Patent 2,624,033. Although a protective circuit of the described character constituted an improvement, it had certain inherent disadvantages. Since the voltage across the reversed cell should be held at the minimum possible value in the interest of both cell protection and maintenance of load voltage, large area junctions in low energy gap semiconductor material are indicated. At the same time, it is desirable that the reverse leakage in the diodes shunting good cells be minimized to prolong shelf life and to improve efficiency. Unfortunately, these requirements are mutually exclusive since the techniques which result in low forward voltages also result in high reverse leakages. Although the problem was well known to those skilled in the art and various other suggestions and proposals were made to solve the same, none of these suggestions and proposals was completely satisfactory and successful.

It has been discovered that the outstanding problem may be solved in a remarkably simple manner.

It is an object of the present invention to improve batteries comprising a plurality of serially connected cells.

It is another object of the present invention to provide a novel and improved anti-reversal device for batteries constituted by a plurality of serially connected sealed rechargeable cells.

It is also within contemplation of the invention to provide an anti-reversal device in the form of a transistor switch combining low forward voltages and exceptionally low reverse leakages.

The invention also contemplates a transistor anti-reversal device which is very simple in character, is of small dimensions and which may be readily manufactured and sold on a practical and commercial scale at a low cost.

Other and further objects and advantages of the present invention will become apparent from the following description, taken in conjunction with the accompanying drawing, in which:

FIGURE 3(a) shows a circuit embodying the invention and utilizing PNP transistors connected to a three cell battery;

FIGURE 3(b) shows a circuit similar to that of 3(a) but utilizing NPN transistors;

FIGURE 3(c) shows a hybrid circuit in which both PNP and NPN transistors are utilized.

Figure 1A:
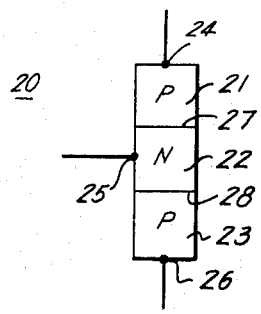
FIGURE 1(a) shows diagrammatically a PNP transistor suitable for the purposes of the present invention.
Figure 1B:
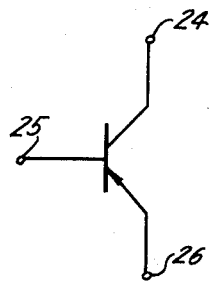
FIGURE 1(b) is a schematic representation of the trnasistor shown in FIGURE 1(a)

Referring now more particularly to FIG. 1(a) of the drawing, reference numeral 20 generally denotes a PNP transistor comprising a P region 21, an N region 22 and another P region 23, having terminals 24, 25 and 26 respectively attached thereto. Junction 27 is defined between regions 21 and 22, and junction 28 is defined between regions 22 and 23.

Transistor action of the device shown in FIGURE 1(a) is one of injection, diffusion, and collection. If terminal 26 is called the emitter, then with proper biases applied, carriers are injected into base region 22 by emitter junction 28. The carriers diffuse across base region 22 and are collected at collector junction 27. It appears that junction 28 could be either the collector or emitter junction, as could junction 27, depending on polarity of the applied biases. If it were so desired, the transistor could be designed to be symmetrical so that operation would be the same regardless of which of these junctions were designated collector. However, this characteristic of the transistor is of only minor importance for the purposes of the present invention.

Figure 2A:
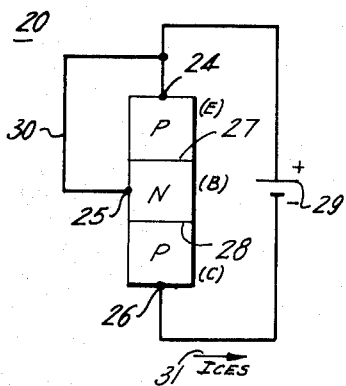
FIGURE 2(a) shows a PNP transistor having its base lead connected in accordance with the invention to shunt a positive potential.

FIGURE 2(a) shows the transistor 20 of FIGURE 1(a) as being connected across a potential having the same polarity as a normally discharging (non-reversed) rechargeable cell 29, similar reference numerals having been used to denote corresponding parts. For such bias polarity terminal 24 must act as the emitter terminal and junction 27 as the emitter junction. Base terminal 25 is directly connected to emitter terminal 24 through a conductor 30, a connection which results in a current of the order of a few microamperes. This leakage current designated as $I_{CES}$ is in the direction shown by arrow 31 and is given by the equation $$I_{CES} = \frac{I_{CO}}{1 - \alpha N \alpha I}$$

where $I_{co}$ is the collector to base leakage current, N is the ratio of collector current to emitter current for normal transistor action and $\alpha I$ is this ratio with collector and emitter interchanged. The transistor is inverted in this scheme. The lowest possible leakage current in a self-biased transistor is obtained by this connection.

Figure 2B:
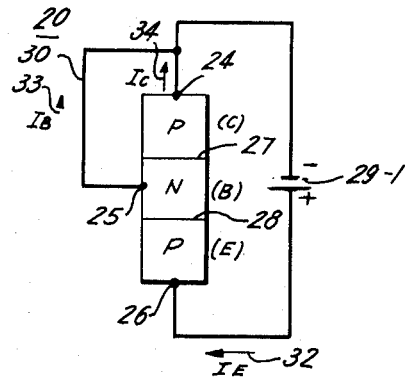
FIGURE 2(b) shows a PNP transistor having its base lead connected in accordance with the invention to shunt a negative potential.
Figure 4:
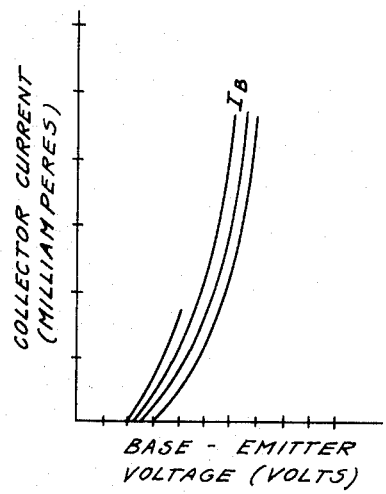
FIGURE 4 shows the shape of a transistor collector current vs. base-emitter voltage transfer characteristic.

FIGURE 2(b) shows the transistor 20 of FIGURE 1(a) as being connected across a potential having the same polarity as a reversed rechargeable cell 29–1. It will be noted that junctions 27 and 28 have interchanged roles, 28 now being the emitter, also, that in this configuration base terminal 25 is shorted to collector terminal 24 through conductor 30, a connection which provides the highest possible self biased transistor conductance. In general, the collector-emitter voltage of a saturated transistor can fall to a value considerably less than the base-emitter voltage. This is, of course, not possible in the circuit of 2(b) where the collector and base are shorted. The transistor will, however, automatically adjust itself to be continuously on the verge of saturation. Thus, the current by-passing the reversed cell 29–1 will be equal to the emitter current:

$$I_E = I_B + I_C = I_B + \beta_N I_B = I_B(1 + \beta_N)$$

where $\beta_N$ is the normal transistor current gain. Since $I_B = f(V_{BE})$ it is seen that $I_B(1 + \beta_N)$ units of current are shunted at a voltage equal to the base emitter voltage corresponding to base current $I_B$. Accordingly, this connection could be considered substantially equivalent in shunting capability to a single diode having a junction area ($\beta_N + 1$) times that of the transistor base-emitter junction without the disadvantages associated with such a large junction. The arrows shown in FIGURES 2(a) and 2(b) (31 and 32, 33, 34, respectively) indicate actual direction of positive current and the collector, base and emitter symbols (C, B, and E) indicate instantaneous roles of these regions. Current amplification is shown, therefore, operation of the anti-reversal device of the invention is distinctly different from the simple shunting action of a conventional diode. The performance of a given transistor type can be predetermined with a high degree of accuracy by reference to the collector current vs. base-emitter voltage transfer characteristics, such as are shown in FIGURE 4. In general, transistors having low input resistance are preferable and germanium types are preferred over silicon types because of lower base to emitter voltages. For example, a germanium transistor obtainable on the market under the designation 2N1303 has been found to provide excellent results in circuits embodying the present invention.

When applying the principles of the present invention to a battery comprising a plurality of series connected rechargeable cells, a transistor is connected across each cell, as this is shown in FIGURES 3(a), 3(b) and 3(c). Either PNP or NPN transistors are suitable (FIGURES 3(a) and 3(b), respectively) provided that the proper polarity is observed. Mixing of types PNP and NPN, as shown in FIGURE 3(b), is equally suitable if for some reason this should be desirable. A resistance of suitable value, in the order of a few ohms, may be interposed in the base lead, though, in general, such resistance will reduce $I_B$ and thus increase impedance of the device. A small resistor might be required, however, for certain transistor types to limit the base current.

Referring now more particularly to FIGURE 3(a), a battery comprising three series connected rechargeable cells 29, 39 and 49 is shown as having its positive terminal at 35 and its negative terminal at 36. A PNP transistor 20 is connected across each cell in such a manner as to have its terminal 24 connected to the positive terminal of the cell and its terminal 26 connected to the negative terminal of the cell. Terminal 24 is directly connected to base terminal 25 through a conductor 30. As it is more fully set forth in connection with FIG. 2(a), for such bias terminal 24 acts as the emitter terminal and junction 27 as the emitter junction. The resulting leakage current will be extremely low, in the order of a few micro-amperes, so that it will not cause any appreciable drain on the charged cell even in several months.

Let it be assumed now that one of the serially connected cells has become completely discharged while the other cells are still delivering current. This will cause polarity reversal of the discharged cell and will establish the conditions illustrated in and described in connection with FIGURE 2(b). Junctions 27 and 28 have interchanged roles, 28 now being the emitter. Under these conditions, the base is shorted to the collector, providing the highest possible self-biased transistor conductance. Thus, the completely discharged or defective cell will be by-passed by a shunting path of very low resistance and detrimental reverse charging of the said cell is positively prevented.

The circuit illustrated in FIGURE 3(b) is practically identical with the one described with reference to the one shown in FIGURE 3(a), except for the fact that instead of PNP transistors 20, an NPN transistor 20–1 is connected across each of cells 29, 39, 49. For this reason, the base of each transistor is connected to the normally negative terminal of the cell by means of a conductor 40. The operation of this circuit will be obvious to those skilled in the art without any detailed description. The same remarks apply to the modification shown in FIGURE 3(c) in which both PNP and NPN transistors are used and which will operate in exactly the same manner as those of FIGURES 3(a) and 3(b) provided that the proper polarity of the base connections 30 and 40 is observed.

From the foregoing description, it is apparent that in the anti-reversal circuits of the invention the transistor does not function as a rectifying diode but as a solid state switch which in response to the direction of the cell potential applied thereto is transferred from its "off" condition (cut-off) to its "on" condition (near saturation).

Although the present invention has been disclosed in connection with a few preferred embodiments thereof, variations and modifications may be resorted to by those skilled in the art without departing from the principles of the invention. All of these variations and modifications are considered to be within the true spirit and scope of the present invention as disclosed in the foregoing description and defined by the appended claims.

What is claimed is:

1. A battery comprising a plurality of cells connected in series, each cell having a pair of terminals of opposite polarity, and a transistor having a base, an emitter, and a collector for each cell with its emitter connected to one cell terminl and its collector connected to the other cell terminal, said base being connected to one of said cell terminals having such polarity as to normally bias said transistor substantially to cut-off and to bias said transistor substantially to saturation upon polarity reversal of the cell.

2. A battery comprising a plurality of rechargeable cells connected in series, a transistor having a base, an emitter, and a collector for each cell with its emitter to collector path connected across the cell, and means for applying biasing potential to said base in response to the polarity of the cell whereby normal polarity of the cell will maintain the resistance between emitter and collector at a high value while polarity reversal of said cell will decrease said resistance to a low value and will effectively by-pass said cell for the discharge current of the battery.

3. The battery according to claim 2, wherein the transistors are of the PNP type.

4. The battery according to claim 2, wherein the transistors are of the NPN type.

5. The battery according to claim 2, wherein certain of the transistors are of the PNP type and the remainder of said transistors are of the NPN type.

6. A battery comprising a plurality of rechargeable cells connected in series, each of said cells having a positive and a negative terminal, a transistor of the PNP type for each of said cells having a base, an emitter and a collector, said emitter and collector being respectively connected to said positive and said negative terminals of the corresponding cell and said base being directly connected to said emitter maintaining the emitter to collector resistance at a very high value during normal discharge of the said cell and causing the emitter to collector resistance to drop to a very low value upon excessive discharge and polarity reversal of said cell thereby by-passing said cell.

References Cited by the Examiner
UNITED STATES PATENTS
3,085,187   4/1963   Godshalk _____ 320—25

OTHER REFERENCES

General Electric Transistor Manual, 6th edition, 1962, p. 223.

LLOYD McCOLLUM, *Primary Examiner.*

STANLEY WEINBERG, *Assistant Examiner.*